(12) United States Patent
Shamshoum et al.

(10) Patent No.: US 6,410,663 B2
(45) Date of Patent: Jun. 25, 2002

(54) ELECTRON DONORS IN A ZIEGLER-NATTA CATALYST FOR THE PRODUCTION OF HIGH MELT FLOW COPOLYMERS

(75) Inventors: Edwar S. Shamshoum, Houston; David J. Rauscher, Webster; Theodore G. Harris, Houston, all of TX (US)

(73) Assignee: Fina Technology, Inc., Houston, TX (US)

(*) Notice: Subject to any disclaimer, the term of this patent is extended or adjusted under 35 U.S.C. 154(b) by 0 days.

(21) Appl. No.: 09/794,191

(22) Filed: Feb. 27, 2001

Related U.S. Application Data

(63) Continuation of application No. 08/174,726, filed on Dec. 29, 1993, now abandoned, which is a continuation-in-part of application No. 07/895,287, filed on Jun. 8, 1992, now abandoned.

(51) Int. Cl.[7] ................................................ C07F 4/616
(52) U.S. Cl. ............... 526/128; 526/124.3; 526/351; 526/348; 526/125.1; 526/158; 502/125; 502/103; 502/158; 502/127; 502/115; 502/116; 502/133; 502/126
(58) Field of Search ............................... 526/128, 124.3, 526/351, 348, 125.1, 158; 502/125, 103, 158, 127, 115, 116, 133, 126

(56) References Cited

U.S. PATENT DOCUMENTS

| | | | |
|---|---|---|---|
| 4,335,016 A | 6/1982 | Dombro | 502/125 |
| 4,420,594 A | 12/1983 | Ueno et al. | 502/158 |
| 4,547,552 A * | 10/1985 | Toyota et al. | 525/247 |
| 4,562,173 A | 12/1985 | Terano et al. | 502/125 |
| 4,816,433 A * | 3/1989 | Terano et al. | 502/127 |
| 4,839,321 A | 6/1989 | Murai et al. | 502/127 |
| 4,927,797 A | 5/1990 | Ewen | 526/124 |
| 4,952,649 A | 8/1990 | Kioka et al. | 526/125 |
| 4,990,477 A | 2/1991 | Kioka et al. | |
| 5,028,671 A * | 7/1991 | Kioka et al. | 526/125 |
| 5,066,738 A * | 11/1991 | Ewen | 526/124 |
| 5,177,043 A | 1/1993 | Koyama et al. | 502/125 |
| 5,192,732 A | 3/1993 | Duranel et al. | 502/125 |
| 5,296,433 A | 3/1994 | Siedel et al. | 502/103 |
| 5,308,818 A | 5/1994 | Shamshoum et al. | 502/125 |
| 5,336,652 A | 8/1994 | Mike et al. | 502/125 |

FOREIGN PATENT DOCUMENTS

| | | | |
|---|---|---|---|
| EP | 385765 | 9/1990 | |
| EP | 0445302 | 9/1990 | |
| EP | 0426140 | 10/1990 | |
| EP | 0461775 | 5/1991 | |
| EP | 0 445 302 | * 9/1991 | |
| JP | 49119979 | 11/1974 | 502/158 |
| JP | 532584 | 1/1978 | 502/125 |
| JP | 62252404 | 11/1987 | 502/158 |
| JP | 1139601 | 6/1989 | 502/158 |

OTHER PUBLICATIONS

"Highlights of Ziegler–Natta Catalysts and Polymerization," J. Boor, Academic Press, NY, pp. 1 and 65 (1979).
R. Morrison and R. Boyd, "Organic Chemistry," 3ed., pp. 80, 82–25 1973.
J. Schofer, Memorandum to AU 1505 regarding Indefiniteness of Ranges within a Range. Feb. 1993.

* cited by examiner

*Primary Examiner*—David W. Wu
*Assistant Examiner*—Ling-Siu Choi
(74) *Attorney, Agent, or Firm*—Gilbreth & Associates

(57) ABSTRACT

The present invention provides a catalyst system that exhibits unexpected control of desired properties in copolymer product. The catalyst system includes a conventional supported Ziegler-Natta catalyst in combination with an electron donor described by the formula:

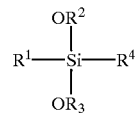

wherein $R^1$ is a linear alkyl group attached to the silicon atom; $R^2$ and $R^3$ are alkyl or aryl groups and $R^4$ is a linear alkyl attached to the silicon atom, $R^1$ and $R^4$ are the same or different. $R^1$ and $R^4$ are preferably linear carbon groups of 4–13 carbon atoms, more preferably 4–7 carbon atoms; most preferably $R^1$ and $R^4$ are the same and are n-butyl groups. The system exhibits good control over the melt flow index of the copolymer products.

15 Claims, 2 Drawing Sheets

ELECTRON DONORS IN A ZIEGLER-NATTA CATALYST FOR THE PRODUCTION OF HIGH MELT FLOW COPOLYMERS

This is a continuation application of application Ser. No. 08/174,726, filed Dec. 29, 1993, now abandoned, which was a continuation-in-part of application Ser. No. 07/895,287, filed on Jun. 8, 1992, now abandoned.

BACKGROUND OF THE INVENTION

1. Field of the Invention

The present invention provides a catalyst system for the copolymerization of olefins, specifically ethylene and propylene, that include the combination of a conventional supported Ziegler-Natta catalyst with an electron donor compound of the formula:

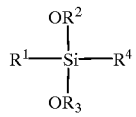

wherein $R^1$ is a linear alkyl group attached to the silicon atom; $R^2$ and $R^3$ are alkyl or aryl groups and $R^4$ is a linear alkyl attached to the silicon atom, $R^1$ and $R^4$ are the same or different.

2. Description of the Prior Art

Catalyst systems for the polymerization of olefins are well known in the art. Typically, these systems include a Ziegler-Natta type polymerization catalyst, a co-catalyst, usually an organoaluminum compound; and an electron donor compound. Examples of such catalyst systems are shown in the following U.S. Pat. Nos. 4,107,413; 4,294,721; 4,439,540; 4,115,319; 4,220,554; 4,460,701; and 4,562,173; the disclosures of catalyst systems designed primarily for the polymerization of propylene and ethylene.

A conventional supported Ziegler-Natta catalyst for the copolymerization of olefins is basically a complex derived from a halide of a transition metal, for example, titanium, chromium or vanadium with a metal hydride and/or a metal alkyl that is typically an organoaluminum compound. These catalyst is usually comprised of a titanium halide supported on a magnesium compound complexed with an alkylaluminum.

An electron donor compound is used in the polymerization reaction to reduce the atactic form of the polymer thereby giving control of and increasing the production of isotactic polymers. Although a broad range of compounds are known generally as electron donors, a particular catalyst may have a specific compound or group of compounds with which it is especially compatible. It has been shown that different dimethoxy donors can be used to affect catalyst performance. The structure of the donor alkyl groups has been shown to affect catalyst hydrogen response. Where the donor contains two linear (i.e., unbranched) alkyl groups, the hydrogen response of the catalyst is enhanced in comparison to donors having branched groups, e.g., cyclohexylmethyldimethoxysilane (CMDS).

The production of high melt flow index ethylene/propylene copolymers requires high levels of hydrogen in the reactor. In the case of a bulk process, the hydrogen is normally completely dissolved in the propylene liquid, but an increase in hydrogen beyond the saturation point would result in the formation of a gas pocket (gas-cap) in the reactor. This results in poor circulation of the reactor and production problems. Moreover, if hydrogen cannot be increased, the donor level may be reduced to increase the effectiveness of the hydrogen, but this would also cause an increase in xylene solubles.

A need has been recognized for higher melt flow index (MFI) copolymer resins. Two obvious methods of increasing the copolymer MFI are: (1) raising the reactor hydrogen level, and (2) lowering the donor concentration to increase hydrogen response. However, these approaches are not practical since the reactor hydrogen level is near saturation, that is, near reactor gas-capping conditions, and the xylene solubles are at the upper level of desirability. For example, if the hydrogen used in a loop reactor process for the copolymerization of propylene in liquid propylene to produce high melt flow index copolymer resins is 0.7 mole percent, and saturation occurs at 0.73 mole percent (145° F., 510 psig). Under these conditions-reduction of donor concentration increases xylene solubles, which tend to be already high in the target range. One solution would be to produce copolymer having a melt flow index of about 1–29 and visbreaking the copolymer at extrusion with an organic peroxide which degrades at high temperature. However, this solution adds another process step, is difficult to control and can add undesirable properties, such as yellowing. The production of high MFI copolymers using d-n-butyldimethoxysilane compared with a standard donor, such as cyclohexylmethyldimethoxysilane (CMDS) donor was examined.

SUMMARY OF THE INVENTION

The present invention provides a process for the copolymerization of olefins, specifically, ethylene and propylene, using the combination of a conventional supported Ziegler-Natta type of catalyst component with a specific group of electron donor compounds which results in significant increases in improved control of the properties of the copolymer product, specifically melt flow index. The catalyst is preferably a Ziegler-Natta catalyst comprising a complex of a dialkoxy magnesium support and a titanium halide, as disclosed in U.S. Pat. Nos. 4,927,797; 4,816,433 and 4,839,321. The electron donor a silane compound of the following formula:

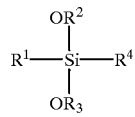

wherein $R^1$ is a linear alkyl group attached to the silicon atom; $R^2$ and $R^3$ are alkyl or aryl groups and $R^4$ is a linear alkyl attached to the silicon atom, $R^1$ and $R^4$ are the same or different, $R^2$ and $R^3$ are the same or different. In preferred embodiments of the invention, $R^1$ is a linear alkyl group of 4–13 carbon atoms, more preferably, 4–7 carbon atoms, $R^2$ and $R^3$ are methyl, ethyl or propyl groups, and $R^4$ is a linear alkyl group of 4–13 carbon atoms, more preferably 4–7 atoms. $R^1$ and $R^4$ are preferably the same and, most preferably, are n-butyl. $R^2$ and $R^4$ are preferably the same and, most preferably, are methyl. The most preferred electron donor is di-n-butyldimethoxysilane (DBDS).

In addition, the system may contain an organoaluminum compound which acts as a co-catalyst. The organoaluminum co-catalyst is preferably an aluminum alkyl, more preferably a trialkylaluminum of the formula $AlR^\wedge_3$ where $R^\wedge$ is an alkyl having 1–8 carbon atoms, $R^\wedge$ being the same or different. Examples of trialkylaluminums are trimethyl aluminum (TMA), triethyl aluminum (TEAl) and triisobutyl aluminum (TiBAl). A preferred co-catalyst is triethylaluminum (TEAl).

The process for the copolymerization of olefins comprises: contacting the new generation polymerization catalyst with an organoaluminum compound, preferably with a trialkylaluminum; contacting the catalyst with an electron donor either simultaneously with or after contact with the organoaluminum, the electron donor being a silane compound as described by the formula above, pre-polymerizing the catalyst by contacting a small amount of monomer with the catalyst; and introducing the catalyst into a polymerization reaction zone containing the organoaluminum compound, the electron donor and the monomers. The process further comprises withdrawing directly from the reactor a copolymer product in which the melt flow index is from about 15 to about 60 without further processing to modify melt flow properties.

BRIEF DESCRIPTION OF THE DRAWINGS

A more complete appreciation of the invention and many of the attendant advantages thereof will be readily understood by reference to the following detailed description when considered in connection with the accompanying drawings in which like numerals in different figures represent the same structures or elements wherein.

DETAILED DESCRIPTION OF THE INVENTION

Figure 1:
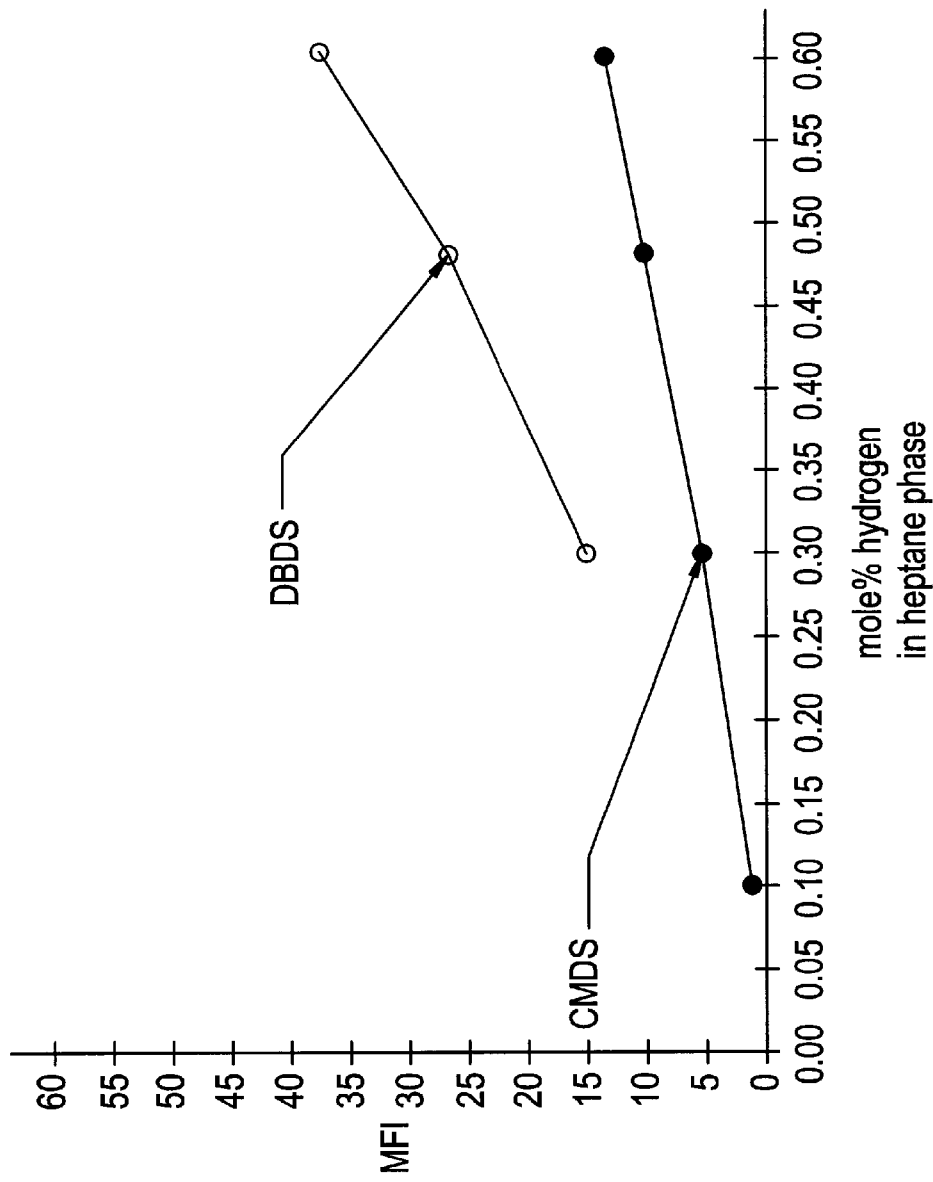
FIG. 1 is a comparison of the effect of CMDS and DBDS donors on copolymer melt flow index.

It has been surprisingly discovered that a specific group of silane compound serving as electron donors in combination with conventional supported Ziegler-Natta catalysts, in particular a specific type of catalysts, i.e., supported $TiCl_4$ with phthalic internal donors, results in significant increases in polydispersity over the previously known efficiencies for this particular type of catalyst as well as other known catalyst systems.

The invention provides a catalyst system capable of polymerizing an olefin monomer with a catalyst efficiency of over 20 kilograms of polymer product per gram of catalyst in one hour. Further, the catalyst system may be characterized by an efficiency of at least 20 kg/g-cat·h while the Si/Ti ratio defined by the mole ratio of the silane electron donor and the titanium component of the catalyst varies within the range 4–200. Additionally, the catalyst system may be further characterized by an efficiency greater than 20 while producing a polymer product with xylene solubles of about 3.00 wt % or less. The catalyst system may be further characterized by having an isotactic capacity such that the system produces a polymer product in which the xylene soluble atactic form may be kept at about 3.00 wt % of the product while the Si/Ti mole ratio varies up to 200. These properties of this invention are covered in U.S. application Ser. No. 07/895,287 filed Jun. 8, 1992, ABN.

The present invention comprises the discovery of an appropriate type of electron donor which affect catalyst performance, in particular, it has been discovered that the structure of the donor affects catalyst hydrogen response. Where the electron donor contains two linear alkyl groups which are directly attached to a silicon atom, the hydrogen response of the catalyst is enhanced in comparison to donors having alkyl groups with at least one being branched at the carbon attached to the silicon atom.

Electron donors are typically used in two ways in the formation of a Ziegler-Natta catalyst and a catalyst system. First, an internal electron donor may be used in the formation reaction of the catalyst as the transition metal halide is reacted with the metal hydride or metal alkyl. Examples of internal electron donors include: amines, amides, ethers, esters, aromatic esters, ketones, nitrites, phosphines, stibines, arsines, phosphoramides, thioethers, thioesters, aldehydes, alcoholates, and salts of organic acids. The second use for an electron donor in a catalyst system is as an external electron donor or selectivity control agent (SCA) for stereoregulation in the polymerization reaction. A description of the two types of electron donors is provided in U.S. Pat. No. 4,535,068, the disclosure of which is hereby incorporated by reference. The same compound may be used in both instances, although typically they are different. A common external electron donor is an organic silicon compound, for example, cyclohexylmethyldimethoxysilane (CMDS), as disclosed in U.S. Pat. Nos. 4,927,797 and 5,066,738, hereby incorporated by reference.

The internal electron-donor compounds suitable for preparing conventional Ziegler-Natta catalyst components include ethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate. These esters of phthalic acid are the preferred donors.

Preferred aromatic hydrocarbons useful as internal electron donors include benzene, xylene, ethylbenzene, propylbenzene and trimethylbenzene. A diester of phthalic acids is preferably used as the diester of the aromatic dicarboxylic acid. Examples include dimethyl phthalate, diethyl phthalate, dipropyl phthalate, diisopropyl phthalate, dibutyl phthalate, diisobutyl phthalate, diamyl phthalate, diisoamyl phthalate, methylbutyl phthalate, ethylbutyl phthalate, ethylisobutyl phthalate and ethylpropyl phthalate.

As the present invention relates particularly to external electron donors, the term "electron donor" as used herein, refers to the external electron donor or selectivity control agent. The external electron donor acts as a stereoregulator to control the amount of atactic form of polymer produced. It may also increase the production of isotactic polymers. Organic silicon compounds are known in the art for use as electron donors. Examples of electron donors that are organic silicon compounds are disclosed in U.S. Pat. Nos. 4,218,339; 4,395,360; 4,328,122; 4,473,660 and 4,927,797. As mentioned, a particular catalyst may produce better results when paired with a particular group of electron donors. Examples of this pairing of catalyst and electron donors are disclosed in U.S. Pat. Nos. 4,562,173; 4,547,552; and 4,927,797.

It has been discovered that a particular group of electron donors does significantly enhance the catalytic properties of a conventional supported Ziegler-Natta catalyst. Preferably, the catalyst component comprises a compound preferably of the general formula $MR^+_x$ where M is a transition metal, R is a halogen or a hydrocarbyloxy and x is the valence of the metal. Preferably, M is a Group IVB, VB or VIB metal, more preferably a Group IVB, and most preferably titanium. Preferably, R is chlorine, bromine, an alkoxy or a phenoxy, more preferably chlorine or ethoxy and most preferably, chlorine. Illustrative examples of the transition metal compound catalyst components are TiCl$_4$, TiBr$_4$, TiI$_4$, Ti(OC$_2$H$_5$)$_3$Cl, Ti(OC$_2$H$_5$)Cl$_3$, Ti(OC$_3$H$_7$)$_2$Cl$_2$, Ti(OC$_4$H$_9$)$_3$Cl Ti(OC$_6$H$_{13}$)$_2$Cl$_2$, Ti(OC$_8$H$_{17}$)$_2$Br$_2$ and Ti(OC$_{12}$H$_{25}$)Cl$_3$, with TiCl$_4$ being preferred. Mixtures of the transition metal compounds may be used. No restriction on the number of transition metal compounds is made as long as at least one transition metal compound is present.

The support should be an inert solid which is chemically unreactive with any of the components of the conventional Ziegler-Natta Catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

One particular Ziegler-Natta catalyst which can be used in the present invention is a Ziegler-type titanium catalyst for the polymerization of olefins as disclosed in U.S. Pat. Nos. 4,927,797; 4,816,433 and 4,839,321, the disclosures of which are hereby incorporated. The catalyst comprises a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

Preferred aromatic hydrocarbons useful in the formation of the catalyst include benzene, xylene, ethylbenzene, propylbenzene and trimethylbenzene. A diester of phthalic acid is preferably used as the diester of the aromatic dicarboxylic acid. Examples include dimethyl phthalate, diethyl phthalate, dipropyl phthalate, diisopropyl phthalate, dibutyl phthalate, diisobutyl phthalate, diamyl phthalate, diisoamyl phthalate, methylbutyl phthalate, ethylbutyl phthalate, ethylisobutyl phthalate and ethylpropyl phthalate. Suitable titanium halides include TiCl$_4$, TiBr$_4$, and TiI$_4$ with TiCl$_4$ being preferred.

The ratios of the respective components are not critical but can vary to tailor the performance of the catalyst. However, in general, the diester of the aromatic dicarboxylic acid is used in an amount of 0.01 to 2 g, preferably 0.1 to 1 g, per gram of the dialkoxy magnesium, and the titanium halide is used in an amount of at least 0.1 g, preferably at least 1 gram, per gram of the alkoxy magnesium. The amount of the aromatic hydrocarbon which is liquid at normal temperature should be sufficient to form a suspension.

Suspension of the dialkoxy magnesium into the aromatic hydrocarbon is performed at a temperature of from room temperature to the boiling point of the aromatic hydrocarbon used for up to 100 hours, preferably up to 10 hours. It is important that the formed suspension should not be a homogeneous solution. The contact of the suspension with the titanium halide and the contact of the composition obtained by said contact with the titanium halide are carried out at a temperature of from −20° C. to the boiling point of the titanium halide used, preferably 50° C. to 120° C., for 10 minutes to 10 hours. The means for contacting the components is not particularly critical, so far as sufficient contact is attained among the respective components. Preferably, the contact is carried out by using a vessel provided with a stirrer.

A significant unexpected result obtained from the combination of the above-described catalyst and DBDS is the dramatic increase in the melt flow index. The present invention provides a process for the copolymerization of olefins using the catalyst and the electron donors described by the above formula comprising:

(a) making a catalyst by the steps comprising:
  (1) selecting a conventional Ziegler-Natta catalyst component;
  (2) contacting the catalyst component with an organoaluminum compound;
  (3) contacting the catalyst component with an electron donor as described above either simultaneously with or after step (2);
(b) introducing said catalyst into a polymerization reaction zone containing monomers under polymerization conditions, and
(c) withdrawing a copolymer product.

Although the catalyst system may be used in almost any commercially known copolymerization process, the preferred process of the present invention includes a pre-polymerization of the catalyst by contacting a small amount of monomer with the catalyst after the catalyst has been contacted with the electron donor. A pre-polymerization process is described in U.S. Pat. Nos. 4,767,735, and 5,122,583, hereby incorporated by reference. As provided in those disclosures, a carrier stream for the catalyst is provided, the catalyst is contacted with the co-catalyst or organoaluminum compound, the catalyst is contacted with the electron donor, the catalyst stream is contacted with a relatively small amount of the total amount of one monomer to be polymerized, the catalyst stream passes through a tubular reactor, and the pre-polymerized catalyst and catalyst stream are introduced into the polymerization reaction zone. The electron donor may be contacted with the catalyst simultaneously with the co-catalyst. A copolymer product may then be withdrawn from the reactor. In using the described catalyst with the electron donors described by the formula above at a Si/Ti molar ration of 100–200, the copolymer product may be characterized by a ethylene incorporation level of about 3% by weight and a melt flow index of from about 15 to about 60.

The production of ethylene/propylene copolymers having a high melt flow index requires high levels of hydrogen in the reactor. It has been shown that donors of the following formula afford an increase in the hydrogen response of the catalyst:

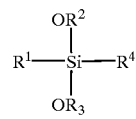

wherein $R^1$ is a linear alkyl group attached to the silicon atom; $R^2$ and $R^3$ are alkyl or aryl groups and $R^4$ is a linear alkyl attached to the silicon atom, $R^1$ and $R^4$ are the same or different. $R^1$ and $R^4$ are preferably linear carbon groups of 4–13 carbon atoms, more preferably 4–7 carbon atoms; most preferably $R^1$ and $R^4$ are the same and are n-butyl groups. The combination of this class of electron donors and a conventional heterogeneous Ziegler-Natta catalyst yields wholly unexpected results that surpass previously known catalyst systems. In particular, DBDS (di-n-butyldimethoxysilane) can be used in order to afford a dramatic increase in copolymer melt flow indices. As shown in the attached figure, replacement of CMDS with DBDS on a molar basis more than doubles the copolymer MFI at relatively the same level of ethylene incorporation.

These results show that DBDS can be used advantageously in place of CMDS to produce high melt flow reactor grade copolymer. In comparison to CMDS, DBDS allows: (1) the use of lower reactor hydrogen levels for a targeted melt flow, and (2) the production of significantly higher melt flow reactor grade products at a given hydrogen level.

While gas phase reactors do not suffer from a gas-capping problem, DBDS could also be used in this process to lower the level of hydrogen required in the reactor to produce a target melt flow index.

Copolymerizations were carried out using the conditions summarized in Table 1. Except for the choice of donor, the same conditions were employed for comparative copolymerizations using CMDS and DBDS. The polymerization results are summarized in Table 2. Definitions for the polymerization results are given in Table 3. Comparable polymerizations were performed using the same conditions, including the total donor level, and differ only in the choice of donor used. In terms of other results, DBDS affords a comparable polymer yield, slightly higher ethylene incorporation, and slightly higher polymer solubles.

The reactor solution (heptane) phase compositions were estimated based upon the solubility of the gases in heptane in the slurry medium under the specified temperature and pressure conditions. The hydrogen/propylene mole ratios in the gas phase (reactor feed gas flows) of 0.02, 0.10, 0.16, and 0.20 correspond to mole ratios in the solution phase of 0.0011, 0.0029, 0.0046, and 0.0057, respectively (i.e., about 0.1, 0.3, 0.5, and 0.6 mole percent relative to propylene). An ethylene/propylene flow ratio of 0.04 was used and the ethylene/propylene mole ratio in the solution phase was 0.012 (i.e., ca. 1.2 mole percent relative to propylene).

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

Prior to a polymerization run, all traces of moisture and air were expelled from a 2 liter reaction vessel by heating to a temperature over 100° C. for a minimum of 30 minutes under a constant purge of dry nitrogen. Following this heating, the reactor was cooled to room temperature (25° C.) under nitrogen. A catalyst system was prepared in a 40 cc reaction vessel by charging 1.0 mmoles of TEAl (co-catalyst) and 1.0 mmoles of DBDS (electron donor), allowing this mixture to contact approximately 5 minutes, then adding 10 mgrams of commercially available heterogeneous Ziegler-Natta catalyst component containing titanium chloride in a mineral oil suspension and allowing it to contact the TEAl-DBDS mixture for approximately 2 minutes. The TEAl-to-titanium molar ratio was 200. The TEAl-to-DBDS molar ratio expressed as the AL/Si ratio was 1 and the DBDS-to-titanium molar ratio expressed as the Si/Ti ratio was 200. At room temperature, the reactor was charged with 0.8 liter of heptane and a mixture of hydrogen and propylene gas flows at a ratio of 0.20 by volume of hydrogen-to-propylene was passed through the reactor under pressure control. As noted above, the hydrogen/propylene mole ratio in the gas phase of 0.20 corresponds to a mole ratio in the solution phase 0.0057 (i.e., about 0.6 mole percent relative to propylene). The catalyst system in the 40 cc reaction vessel was flushed into the reactor using 0.2 liter of heptane. Ethylene was then added to the mixture of gas flows passed through the reactor and the temperature of the reactor was raised to 60° C. An ethylene-to propylene flow ratio of 0.04 by volume was used. The polymerization in the reactor proceeded for one hour and was then terminated by stopping the gas flows, venting the gas pressure from the reactor and rapidly cooling the reactor to room temperature. The reactor was opened and a large volume of methanol was added to the copolymer product slurry in the heptane solvent. The slurry was filtered and the solid product obtained was dried under vacuum. The filtrate was reduced in volume under vacuum to recover the heptane soluble fraction of the copolymer. The catalyst efficiency was calculated by dividing the total yield of copolymer by the exact weight of catalyst used for the polymerization. The weight percentage of ethylene incorporated into the heptane insoluble copolymer was determined by infrared spectroscopy analysis of pressed films using the intensity measurement of methylene peaks at 722 and 732 wavenumbers. This analysis was standardized using ethylene values determined from the carbon 13 NMR analyses of comparable copolymers. The randomness factor was calculated by dividing the measurement of single ethylene insertions by the measurement for multiple ethylene insertions. Total solubles was determined by summing the weight percentages relative to the total copolymer yield of heptane soluble copolymer and the xylene solubles from the heptane insoluble copolymer. The xylene solubles of the heptane insoluble copolymer were measured by dissolving the copolymer in hot xylene, cooling the solution to 0° C. and precipitating the insoluble polymer. The xylene solubles were the fraction of polymer that remained dissolved in the cold xylene. The melt flow indices of the heptane insoluble copolymers were the weight in grams of copolymer extruded in ten minutes using equipment and techniques conforming to ASTM "Standard Test Method for Melt Flow Rates of Thermoplastics by Extrusion Plastometer" (ASTM designation: D1238-90b). The copolymerization results are tabulated in Table 1.

POLYMERIZATION CONDITIONS
reagents:
catalyst: 10 mg raw catalyst
TEAl: 1.0 mmoles
donor: 0.5 mmoles CMDS or DBDS
Al/Ti: 200
Al/Si: 1–2
Si/Ti: 100–200
slurry medium: 1.0 L n-heptane
conditions:
temp.: 60° C. (140° F.)
time: 1 hour
pressure: 80 psig
precontact: standard, single vessel
reactor feed (gas phase):
propylene: 4 liter/min
ethylene: 160 cc/min
hydrogen: 160 cc/min
ethylene/propylene flow ratio: 0.04
hydrogen/propylene flow ratio: 0.20
(solution phase):
ethylene/propylene mole ratio: 0.012
hydrogen/propylene mole ratio: 0.0057

EXAMPLE 2–7

The procedure of Example 1 was repeated, with the changes in hydrogen-to-propylene flow ratios or with changes in the DBDS level indicated by the Al/Si and Si/Ti ratios in Tables 1. The polymerization results are also tabulated in Table 1.

COMPARATIVE EXAMPLES 1–9

The procedure of Example 1 was repeated, with the exception that CMDS was substituted for DBDS as the electron donor and the hydrogen-to-propylene flow ratios and the level of electron donor (as indicated by the Al/Si and Si/Ti ratios) was changed. The polymerization results are tabulated in Table 1.

results for DBDS are consistent with a target 30 MFI under conditions using lower hydrogen levels and higher donor concentrations. Starting from the CMDS conditions affording the 30 MFI copolymer (Al/Si=2, hydrogen/propylene solution phase mole ratio=0.6%), DBDS affords a 30 MFI copolymer either by doubling the donor level or halving the hydrogen level.

TABLE 1

|  | Donor | Al/Si | Si/Ti | Gas Feed C2/C3= flow ratio | Gas Feed H2/C3= flow ratio | Heptane H2/C3= molar ratio | Yield | % XS | Total solubles | MFI | Wt. % Ethylene | Randomness Factor |
|---|---|---|---|---|---|---|---|---|---|---|---|---|
| Example |  |  |  |  |  |  |  |  |  |  |  |  |
| 1 | DBDS | 1 | 200 | 0.04 | 0.20 | 0.0057 | 25 | 2.5 | n/a[b] | 37.0 | 3.0 | 3.3 |
| 2 | DBDS | 1 | 200 | 0.04 | 0.16 | 0.0046 | 24 | 3.1 | 12.5 | 26.0 | 3.8 | 2.4 |
| 3 | DBDS | 1 | 200 | 0.04 | 0.10 | 0.0029 | 29 | 3.0 | 13.7 | 15.0 | 3.8 | 2.5 |
| 4 | DBDS | 1.5 | 144 | 0.04 | 0.20 | 0.0057 | 50 | 3.3 | 10.0 | 48.0 | 3.1 | 3.0 |
| 5 | DBDS | 2 | 100 | 0.04 | 0.20 | 0.0057 | 68 | 4.1 | 10.8 | [a] | 3.0 | 2.9 |
| 6 | DBDS | 2 | 100 | 0.04 | 0.16 | 0.0046 | 59 | 3.7 | 14.3 | 45.0 | 3.3 | 2.6 |
| 7 | DBDS | 2 | 100 | 0.04 | 0.10 | 0.0029 | 54 | 4.0 | 13.1 | 27.9 | 3.2 | 2.5 |
| Comparative Example |  |  |  |  |  |  |  |  |  |  |  |  |
| 1 | CMDS | 1 | 200 | 0.04 | 0.20 | 0.0057 | 37 | 2.6 | 10.7 | 13.2 | 3.1 | 3.0 |
| 2 | CMDS | 1 | 200 | 0.04 | 0.16 | 0.0046 | 25 | 2.4 | 11.4 | 10.0 | 3.0 | 3.1 |
| 3 | CMDS | 1 | 200 | 0.04 | 0.10 | 0.0029 | 24 | 2.5 | 11.8 | 5.3 | 2.8 | 3.2 |
| 4 | CMDS | 1 | 200 | 0.04 | 0.04 | 0.0011 | 27 | 2.7 | 10.1 | 1.4 | 3.2 | 2.6 |
| 5 | CMDS | 1.5 | 133 | 0.04 | 0.20 | 0.0057 | 56 | 2.9 | 8.4 | 1.7 | 2.9 | 3.3 |
| 6 | CMDS | 2 | 100 | 0.04 | 0.20 | 0.0057 | 67 | 3.1 | 8.0 | 7.0 | 2.4 | 3.8 |
| 7 | CMDS | 2 | 100 | 0.04 | 0.16 | 0.0046 | 49 | 3.1 | n/a[b] | 20.8 | 3.2 | 2.6 |
| 8 | CMDS | 2 | 100 | 0.04 | 0.10 | 0.0029 | 60 | 3.4 | 9.9 | 2.1 | 3.0 | 2.9 |
| 9 | CMDS | 2 | 100 | 0.04 | 0.04 | 0.0011 | 56 | 4.0 | 9.8 | 3.4 | 3.2 | 2.5 |

[a]. The MFI for this run was too high to be accurately determined; therefore, an arbitrary value of 60 was used in the FIGS.
[b]. "n/a" indicates the the reaction mixture would not filter well and little, if any, heptane soluble polymer (HSP) could be isolated.
% XS - percentage xylene solubles in HIP.
MFI - melt flow index in grams per 10 minutes.
Wt. % ethylene - total weight percentage ethylene in polymer (% singe + % multiple insertions).
randomness factor - ratio of weight % single to % multiple insertions.

The use of DBDS donor roughly doubled the copolymer melt flow obtained at a given hydrogen level. FIG. 1 compares the hydrogen response using CMDS and DBDS donors by graphing the copolymer melt flow index as a function of the solution phase hydrogen/propylene mole ratio. Under these laboratory conditions, CMDS affords a roughly 30 MFI copolymer product at an Al/Si molar ratio of 2 and a solution phase hydrogen/propylene molar ratio of 0.006 (i.e., 0.6 mole % relative to propylene). The production of a 30 MFI copolymer using CMDS requires a relatively high level of hydrogen and a decrease in the concentration of donor.

In contrast, under the same conditions, DBDS yields a 60 melt flow product. DBDS yields a 30 MFI copolymer using solution phase hydrogen/propylene mole ratios of approximately 0.0052 and 0.00032 (i.e., ca. 0.52 and 0.32 percent relative to propylene) for Al/Si ratios of 1 and 2, respectively. At an Al/Si ratio of 1, CMDS afforded only a 13 MFI copolymer using the highest level of hydrogen.

Also shown in FIG. 1, the melt flow indices exhibit nearly linear increasing trends as a function of hydrogen level, and the slope appears to increase as the donor level is lowered (i.e., from an Al/Si ratio of 1 to 2).

Figure 2:
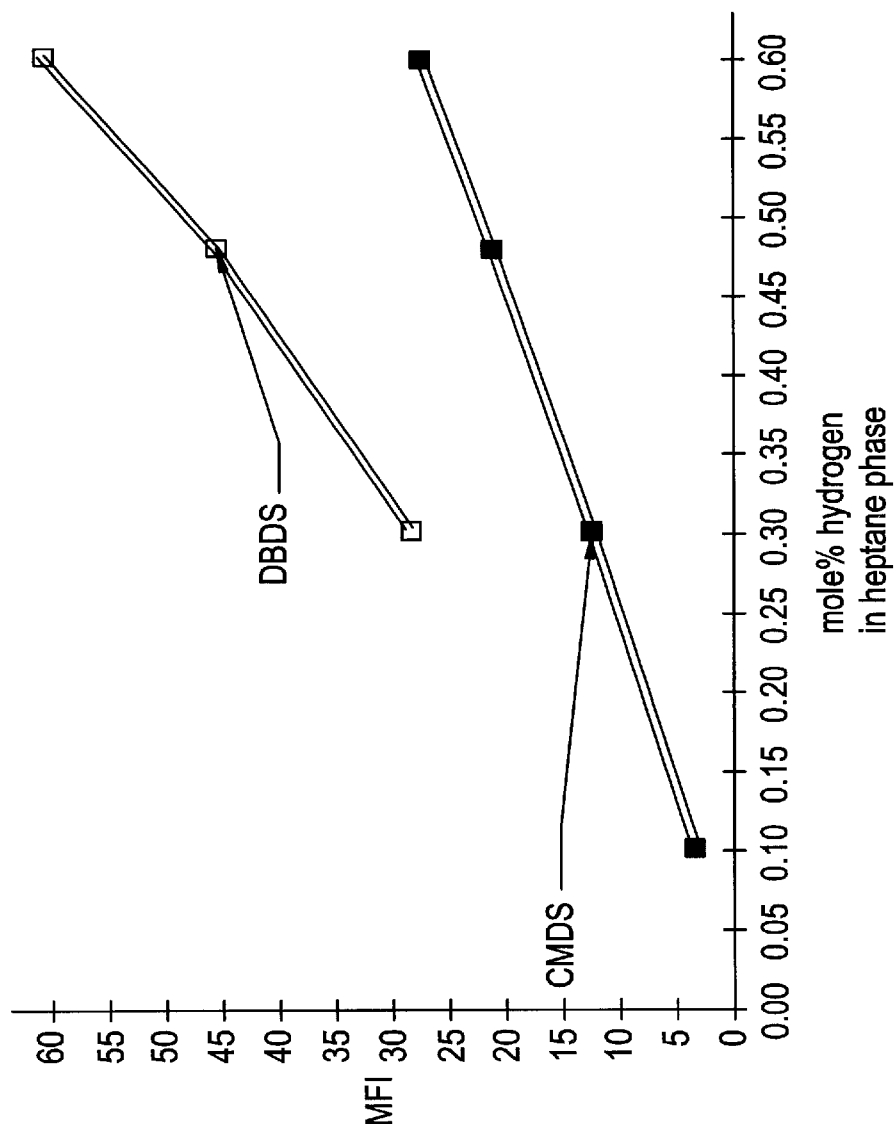
FIG. 2 is a comparison of the effect of CMDS and DBDS donors copolymer melt flow index.

As expected, a graph of melt flow as a function of donor level (FIG. 2) shows that melt flow decreases with increasing donor as the hydrogen level is held constant. The results for DBDS exhibit a linear trend, and the melt flow decreases from 60 to 37 for Al/Si ratios of 200 and 100, respectively. Thus, aside from the production of a 60 MFI copolymer, the Total solubles increase when DBDS is used, and it may be that the increases in MFI observed are due, in part, to this increase. The difference in hydrogen response between CMDS and DBDS is aptly demonstrated by a comparison of two bulk homopolymerization results performed under identical conditions:

COMPARATIVE EXAMPLES 1–9

1 hour bulk propylene polymerization at 70° using 10 mgrams catalyst, 1.0 mmoles TEAl (Al/Ti=200)

|  | CMDS run | DBDS run |
|---|---|---|
| Al/Si ratio: | 5 | 5 |
| hydrogen (mmoles): | 16 | 16 |
| yield (gms): | 284 | 292 |
| xylene solubles: | 1.40 | 1.44 |
| MFI: | 2.34 | 5.60 |

These results, together with the copolymerization results, show that DBDS effectively doubles the polymer MFI from that afforded by CMDS. The enhanced hydrogen response of DBDS gives it a clear advantage over CMDS by allowing high MFI copolymer to be produced at both lower reactor hydrogen levels and higher donor levels—two changes which are not practical for CMDS. The use of DBDS donor in the place of CMDS significantly increases hydrogen response. Under given polymerization conditions, DBDS roughly doubles the MFI obtained from that for CMDS.

In contrast to CMDS, DBDS can afford high MFI copolymers using (1) lower reactor hydrogen levels, and; (2) higher donor concentrations—two changes which are not practical for CMDS. In fact, starting from the CMDS conditions affording the 30 MFI copolymer, either the hydrogen level can be halved or the donor level doubled using DBDS to obtain 30 MFI. Therefore, DBDS has potential utility in the production of new high MFI copolymer resins (e.g. 60 MFI).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A process for the copolymerization of olefins, comprising:
   (a) making a catalyst by the steps comprising:
      (2) selecting a conventional Ziegler-Natta catalyst component supported on a magnesium compound wherein the conventional supported Ziegler-Natta catalyst component is obtained by:
         (iii) suspending a dialkoxy magnesium is an aromatic hydrocarbon that is liquid at normal temperatures;
         (iv) contacting the dialkoxy magnesium with a titanium halide and further
         (v) contacting the resulting composition a second time with the titanium halide, and contacting the dialkoxy magnesium with a diester of an aromatic dicarboxlic acid at some point during the treatment with the titanium halide in steo (ii); and
   (2) contacting the catalyst component with an organoaluminum compound;
   (3) contacting said catalyst component with an electron donor either simultaneously with or after step (2), said electron donor being described by the formula:

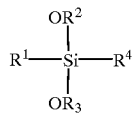

wherein $R^1$ is a linear alkyl group attached to the silicon atom; $R^2$ and $R^3$ are alkyl or aryl groups and $R^4$ is a linear alkyl attached to the silicon atom, $R^1$ and $R^4$ are the same or different;

(b) introducing said catalyst into a polymerization reaction zone containing ethylene and propylene under polymerization conditions; and (c) withdrawing a copolymer product having a high melt flow index in the range of from about 15 to about 60.

2. The process of claim 1 wherein the copolymer product has a level of ethylene incorporation of less than or equal to 6% by weight.

3. The process of claim 1 wherein the organoaluminum co-catalyst is a trialkylaluminum of the formula $AlR^{\wedge}_3$ where $R^{\wedge}$ is an alkyl having 1–8 carbon atoms, $R^{\wedge}$ being the same or different.

4. The process of claim 3 wherein the organoaluminum co-catalyst is trimethyl aluminum, triethyl aluminum and triisobutyl aluminum.

5. The process of claim 4 wherein said organoaluminum compound is triethylaluminum.

6. The process of claim 1 wherein $R^1$ and $R^4$ are linear alkyls of 4–13 carbon atoms.

7. The process of claim 6 wherein $R^1$ and $R^4$ are linear alkyls of 4–7 carbon atoms.

8. The process of claim 7 wherein $R^1$ and $R^4$ are the same.

9. The process of claim 8 wherein $R^1$ and $R^4$ are n-butyl groups.

10. The process of claim 1 wherein said electron donor is di-n-butyl dimethoxy silane.

11. The process of claim 1 wherein said process is characterized by a Si/Ti molar ratio of about 100 to about 200 and by the copolymer product having an ethylene incorporation level of about 3% by weight.

12. The process of claim 11 wherein said process is characterized by producing a copolymer product in which the melt flow index is in the range of from about 15 to about 40 at a Si/Ti ratio of about 200.

13. The process of claim 11 wherein said process is characterized by producing a copolymer product in which the melt flow index is in the range of from about 25 to about 60 at a Si/Ti ratio of about 100.

14. The process of claim 1 further comprising:
   pre-polymerizing said catalyst by contacting a small amount of one monomer with said catalyst after step (a).

15. The process of claim 14 wherein said monomer is propylene.

* * * * *